US011880853B2

(12) United States Patent
Zarakas et al.

(10) Patent No.: US 11,880,853 B2
(45) Date of Patent: Jan. 23, 2024

(54) UTILIZING MACHINE LEARNING AND TRANSACTION DATA TO DETERMINE FUEL PRICES AT FUEL STATIONS

(71) Applicant: Capital One Services, LLC, McLean, VA (US)

(72) Inventors: James Zarakas, Centreville, VA (US); Adam Vukich, Alexandria, VA (US); Molly Johnson, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 65 days.

(21) Appl. No.: 17/088,211

(22) Filed: Nov. 3, 2020

(65) Prior Publication Data

US 2022/0138785 A1    May 5, 2022

(51) Int. Cl.
*G06Q 30/0201*    (2023.01)
*G06Q 30/0204*    (2023.01)
*G06N 20/00*    (2019.01)
*G06Q 50/06*    (2012.01)
(Continued)

(52) U.S. Cl.
CPC ....... *G06Q 30/0206* (2013.01); *G06F 18/214* (2023.01); *G06F 18/23* (2023.01); *G06N 20/00* (2019.01); *G06Q 30/0205* (2013.01); *G06Q 50/06* (2013.01)

(58) Field of Classification Search
CPC ..................................................... G06F 16/285
See application file for complete search history.

(56) References Cited

U.S. PATENT DOCUMENTS

| 8,060,423 | B1 * | 11/2011 | Rukonic | ................ | G06Q 40/00 |
|   |   |   |   |   | 707/950 |
| 8,781,990 | B1 * | 7/2014 | de Alfaro | .............. | G06F 16/335 |
|   |   |   |   |   | 706/52 |
| 9,909,890 | B2 |  3/2018 | Bulpitt |   |   |

(Continued)

FOREIGN PATENT DOCUMENTS

WO    WO-2008100904 A1 *    8/2008    ............. G06Q 30/02

OTHER PUBLICATIONS

GasBuddy, crowdsourcing fuel availability, Jun. 1, 2018, www.gasbuddy.com/go/publications (Year: 2018).*

(Continued)

*Primary Examiner* — Michael P Harrington
*Assistant Examiner* — Matthew Parker Goodman
(74) *Attorney, Agent, or Firm* — Harrity & Harrity, LLP

(57) ABSTRACT

A fuel price determination system may receive transaction data identifying purchases, made with transaction cards and mobile transaction card applications of client devices, of fuel at fuel stations. The fuel price determination system may receive location data identifying locations associated with users of the client devices and the transaction cards, and user history data associated with prior purchases of fuel at fuel stations by the users. The fuel price determination system may process the transaction data, location data, and user history data, with a machine learning model, to determine fuel prices at the fuel stations. The fuel price determination system may determine a ranked list of particular fuel stations in a geographical area based on the fuel prices and populate, based on the location data and the ranked list, a map to identify the particular fuel stations and the fuel prices at the particular fuel stations.

20 Claims, 9 Drawing Sheets

(51) Int. Cl.
*G06F 18/23* (2023.01)
*G06F 18/214* (2023.01)

(56) References Cited

U.S. PATENT DOCUMENTS

| | | | | |
|---|---|---|---|---|
| 10,242,019 | B1* | 3/2019 | Shan | G06F 16/285 |
| 10,281,289 | B2* | 5/2019 | Nevrekar | G01C 21/3682 |
| 10,445,152 | B1* | 10/2019 | Zhang | G06F 9/542 |
| 2008/0195432 | A1* | 8/2008 | Fell | G06Q 30/0206 |
| | | | | 705/16 |
| 2008/0313013 | A1* | 12/2008 | Fell | G06Q 30/02 |
| | | | | 705/413 |
| 2008/0313014 | A1* | 12/2008 | Fell | G06Q 30/0202 |
| | | | | 705/400 |
| 2010/0161720 | A1* | 6/2010 | Colligan | H04W 4/02 |
| | | | | 711/E12.002 |
| 2011/0015856 | A1* | 1/2011 | Arnold | G01C 21/3611 |
| | | | | 704/E13.011 |
| 2014/0372221 | A1* | 12/2014 | Momin | G06Q 30/0266 |
| | | | | 705/14.63 |
| 2015/0227925 | A1* | 8/2015 | Filler | G06F 3/0412 |
| | | | | 382/100 |
| 2015/0332414 | A1* | 11/2015 | Unser | G06F 16/285 |
| | | | | 705/30 |
| 2016/0035001 | A1 | 2/2016 | Driscoll et al. | |
| 2017/0098257 | A1* | 4/2017 | Keller | G06Q 30/0226 |
| 2020/0126123 | A1* | 4/2020 | Loriaux | H04W 4/029 |

OTHER PUBLICATIONS

GasBuddy, 2017: The Year of the Customer, 2017, www.gasbuddy.com/go/publications (Year: 2017).*
GasBuddy, 2017: Serving Your Customers This Holiday Season, 2016, www.gasbuddy.com/go/publications (Year: 2016).*
Chester, Your Ultimate Guide to Gasbuddy: Saving at the Pump, Apr. 1, 2020, chestertravels.com/ultimate-guide-to-gasbuddy/ (Year: 2020).*
David Goldman, 5 best apps to find cheap gas, Dec. 29, 2014, CNN, https://money.cnn.com/2014/12/29/technology/mobile/gas-price-apps/index.html (Year: 2014).*
Jluo, GasBuddy: A Platform for Crowdsourced Gas Price Data, Mar. 25, 2018, Digital Innovation and Transformation, https://digital.hbs.edu/platform-digit/submission/gasbuddy-a-platform-for-crowdsourced-gas-price-data/#:~:text=GasBuddy (Year: 2018).*
How GasBuddy is Changing the Consumer Data Game, Mar. 8, 2018, https://www.catalystdigital.com/blog/gas-buddy/#:~:text=GasBuddy%20has%20data.&text=Most%20location%2Dbased%20apps%20often,location%20data%20points%20per%20day. (Year: 2018).*
https://chestertravels.com/ultimate-guide-to-gasbuddy (Year: 2019).*
Daniel Novykov, How I Designed My First App, Nov. 27, 2017, https://www.freecodecamp.org/news/how-a-marketer-attempted-to-design-an-app-e334660a70b2/ (Year: 2017).*
Mike Blumenthal, How Do Daily Gas Prices Stay Accurate in Google Maps & Elsewhere?, Feb. 3, 2017,https://blumenthals.com/blog/2017/02/03/how-do-daily-gas-prices-stay-accurate-in-google-maps-elsewhere/ (Year: 2017).*

* cited by examiner

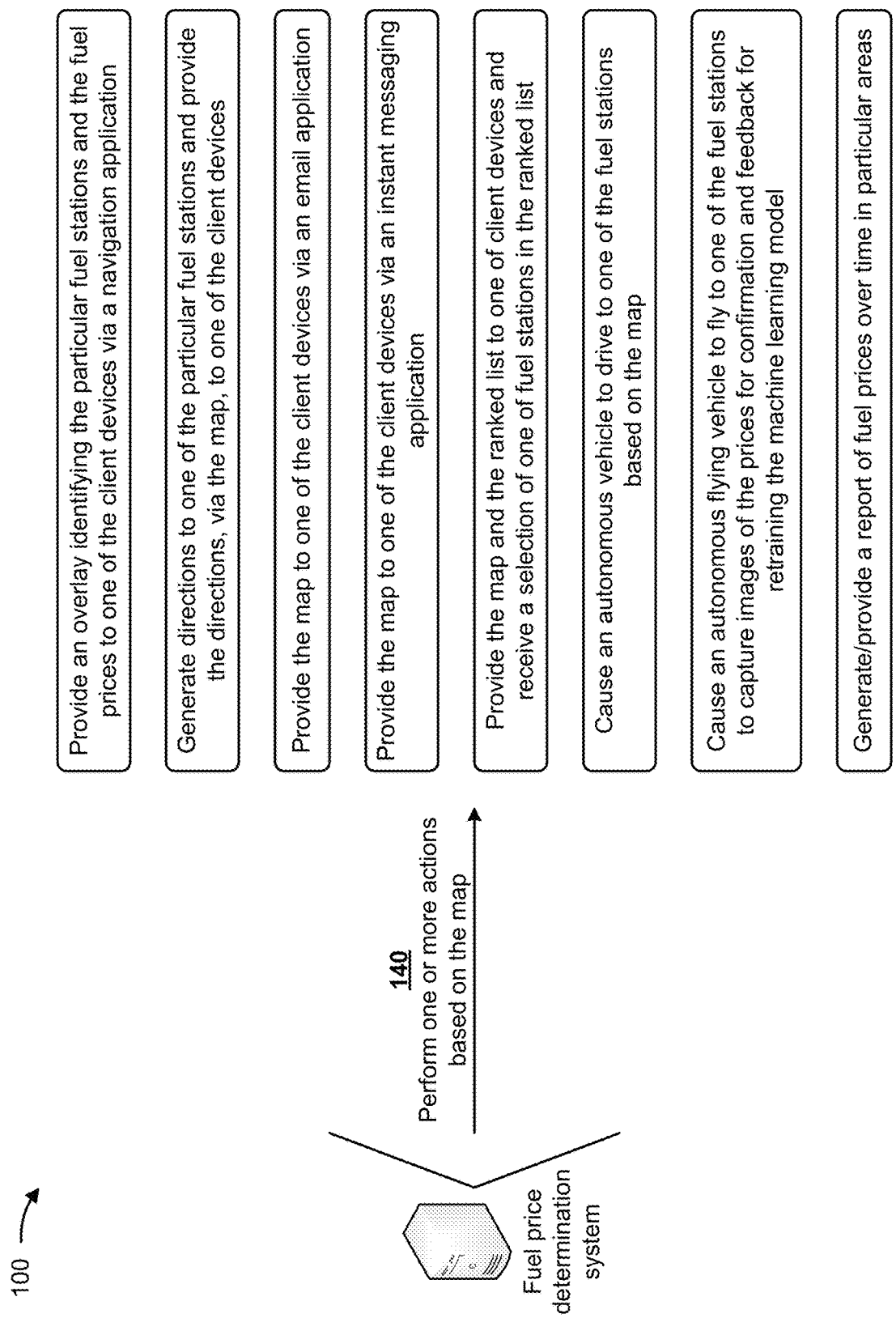

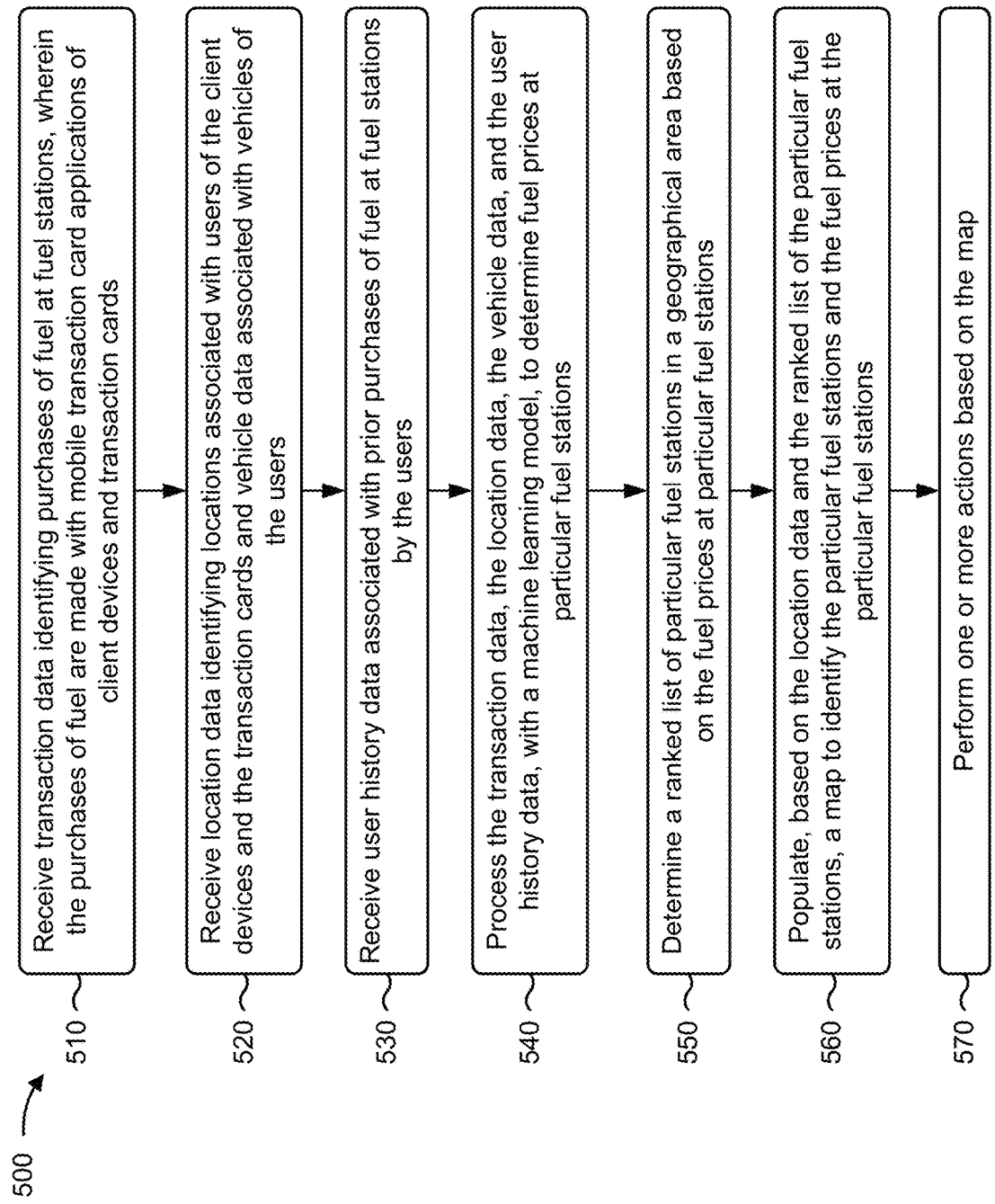

UTILIZING MACHINE LEARNING AND TRANSACTION DATA TO DETERMINE FUEL PRICES AT FUEL STATIONS

BACKGROUND

Fuel price applications allow users to gain information about fuel prices at different fuel stations. For example, a fuel price application installed on a mobile device may display fuel price information for fuel stations in a vicinity of the mobile device.

SUMMARY

In some implementations, a method may include receiving transaction data identifying purchases of fuel at fuel stations, wherein the purchases of fuel are made with: mobile transaction card applications of client devices, and transaction cards. The method may include receiving location data identifying locations associated with users of the client devices and the transaction cards, and receiving user history data associated with prior purchases of fuel at fuel stations by the users. The method may include processing the transaction data, the location data, and the user history data, with a machine learning model, to determine fuel prices at the fuel stations. The method may include determining a ranked list of particular fuel stations in a geographical area based on the fuel prices at the particular fuel stations. The method may include populating, based on the location data and the ranked list of the particular fuel stations, a map to identify the particular fuel stations and the fuel prices at the particular fuel stations, and performing one or more actions based on the map.

In some implementations, a fuel price determination system may include one or more memories and one or more processors to receive transaction data identifying purchases of fuel at fuel stations, wherein the purchases of fuel are made with: mobile transaction card applications of client devices, and transaction cards. The fuel price determination system may receive location data identifying locations associated with users of the client devices and the transaction cards, and receive user history data associated with prior purchases of fuel at fuel stations by the users. The fuel price determination system may process the transaction data, the location data, and the user history data, with a machine learning model, to determine fuel amounts associated with the purchases of fuel, and to determine fuel prices at the fuel stations based on the fuel amounts. The fuel price determination system may determine a ranked list of particular fuel stations in a geographical area based on the fuel prices at the particular fuel stations. The fuel price determination system may populate, based on the location data and the ranked list of the particular fuel stations, a map to identify the particular fuel stations and the fuel prices at the particular fuel stations, and perform one or more actions based on the map.

In some implementations, a non-transitory computer-readable medium may store one or more instructions that, when executed by one or more processors, may cause the one or more processors to receive transaction data identifying purchases of fuel at fuel stations, wherein the purchases of fuel are made with: mobile transaction card applications of client devices, and transaction cards. The one or more instructions may cause the one or more processors to receive location data identifying locations associated with users of the client devices and the transaction cards, and receive user history data associated with prior purchases of fuel at fuel stations by the users. The one or more instructions may cause the one or more processors to process the transaction data, the location data, and the user history data, with a machine learning model, to determine fuel prices at the fuel stations. The one or more instructions may cause the one or more processors to determine a ranked list of particular fuel stations in a geographical area based on the fuel prices at the particular fuel stations. The one or more instructions may cause the one or more processors to determine, based on the location data and the ranked list of the particular fuel stations, information identifying the particular fuel stations and the fuel prices at the particular fuel stations, and provide the information to one of the client devices.

BRIEF DESCRIPTION OF THE DRAWINGS

FIGS. 1A-1E are diagrams of an example implementation described herein.

FIG. 5 is a flow chart of example processes relating to utilizing machine learning and transaction data to determine fuel prices at fuel stations.

DETAILED DESCRIPTION

Figure 1A:
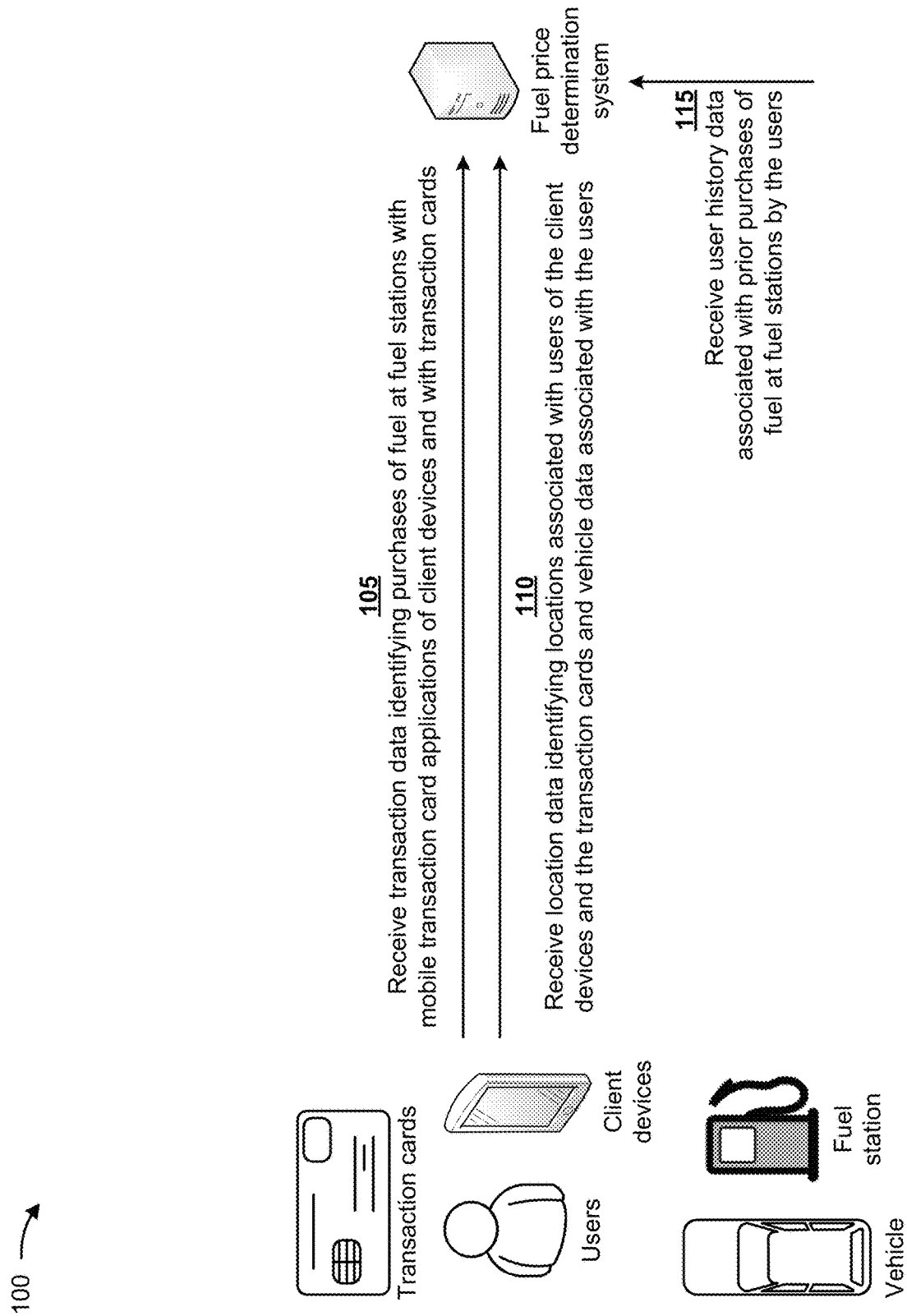

The following detailed description of example implementations refers to the accompanying drawings. The same reference numbers in different drawings may identify the same or similar elements.

Users of fuel price applications (e.g., operators of vehicles) may rely on fuel prices provided by the fuel price applications to choose fuel stations at which to purchase fuel. However, current fuel price applications provide fuel prices that have been recently (e.g., in a past 24 hours) submitted by humans (e.g., other users of the fuel price applications, representatives of the fuel stations, and/or the like). As human entry of fuel prices is inconvenient, time-consuming, and/or cumbersome, the fuel prices may not be entered frequently (e.g., as often as the fuel prices change) or entered at all. Furthermore, humans may enter fuel prices incorrectly, representatives of fuel stations may misrepresent the fuel prices, and/or the like. As a result, the fuel prices provided by a current fuel price application may be inaccurate.

A user who chooses a fuel station based on such an inaccurate fuel price, and then discovers the inaccuracy upon arriving at the fuel station, may then decide to use a different fuel station and travel to the different fuel station. This wastes computing resources (e.g., processing resources, memory resources, communication resources, and/or the like), networking resources, and/or the like, such as resources of a client device that are required for the user to perform research to identify and select the different fuel station, and/or resources of a client device or navigation system required to compute a route to the different fuel station. Furthermore, this wastes time of the user and resources associated with the vehicle, such as fuel required to travel to the different fuel station.

Some implementations described herein provide a fuel price determination system that utilizes machine learning and transaction data to determine fuel prices at fuel stations. For example, the fuel price determination system may receive transaction data identifying purchases of fuel at fuel stations, wherein the purchases of fuel are made with mobile transaction card applications of client devices, and transaction cards. The fuel price determination system may receive location data identifying locations associated with users of the client devices and the transaction cards, vehicle data associated with users, and may receive user history data associated with prior purchases of fuel at fuel stations by users. The fuel price determination system may process the transaction data, the location data, the vehicle data, and the user history data, with a machine learning model, to determine fuel prices at the fuel stations. The fuel price determination system may determine a ranked list of particular fuel stations based on the fuel prices at the particular fuel stations. The fuel price determination system may populate, based on the location data and the ranked list of the particular fuel stations, a map to identify the particular fuel stations and the fuel prices at the particular fuel stations, and may perform one or more actions based on the map.

In this way, the fuel price determination system enables a user to identify fuel stations with fuel prices that have a higher degree of accuracy than fuel prices that are based only on recent human input. This, in turn, conserves computing resources (e.g., processing resources, memory resources, communication resources, and/or the like), networking resources, and/or the like, such as resources of a client device that would otherwise be required for the user to perform research to identify a different fuel station, resources of the client device or a navigation system that would otherwise be required to compute a different route to a different fuel station, and/or the like. Furthermore, this saves time of the user and resources associated with the vehicle, such as fuel required to travel to the different fuel station.

FIGS. 1A-1E are diagrams of an example 100 associated with a fuel price determination system that utilizes machine learning and transaction data to determine fuel prices at fuel stations. As shown in FIGS. 1A-1E, example 100 includes a fuel price determination system, and includes transaction cards and client devices of users, who may each be associated with a vehicle and utilize a fuel station to provide fuel to the vehicle. The fuel station may be a site of a business or establishment that includes at least one fuel dispenser (e.g., gasoline pump) for dispensing fuel to vehicles, and may include additional elements such as a retail store or booth that sells food, beverages, and other items. A transaction card, of the transaction cards, may include a credit card, a debit card, a gift card, a payment card, an ATM card, and/or the like that may be used to complete a transaction such as a purchase of fuel at the fuel station by a user of the transaction card.

A client device, of the client devices, may include a mobile device (e.g., a smartphone, a tablet computer, and/or the like) associated with the user. Additionally, or alternatively, the client device may include an in-vehicle device that may perform functions associated with the vehicle or the user, such as monitoring information and status of the vehicle, providing navigation for the vehicle, facilitating payments by the user, and/or the like. In some implementations, the client device may include a mobile transaction card application that facilitates transactions (e.g., purchases) using an account associated with the transaction card. The mobile transaction card application may be downloaded by the user (e.g., from an app store) upon being made available by an institution (e.g., a bank) associated with the transaction card and transaction account.

In some implementations, the client device may include one or more other applications that interact with the fuel price determination system, such as a fuel purchase application, a navigation application, a fleet tracking application, and/or the like. These one or more other applications are referred to hereinafter as fuel price determination applications. The client device may obtain a fuel price determination application by, for example, downloading the fuel price determination application from an app store or other source, agreeing to allow the fuel price determination system to obtain information, associated with purchases of fuel, from the client device, and/or the like. The user may use the fuel price determination application to request fuel prices, to view fuel stations and fuel prices associated with the fuel stations, and/or the like. Additionally, the fuel price determination application may obtain information from the user related to purchase habits of the user, may facilitate providing, to the fuel price determination system, data related to purchases of fuel made by the user, and/or the like.

The fuel price determination system may include a platform (e.g., a server or group of servers) that utilizes machine learning to determine fuel prices at different fuel stations based on inputs to the machine learning model. The inputs may include transaction data identifying purchases of fuel at fuel stations, location data identifying locations of client devices, vehicle data, and/or user history data. The fuel price determination system may receive the inputs from the fuel price determination application, from the mobile transaction card application, and/or the like.

The description below with respect to FIGS. 1A and 1B relates to receiving and processing data based on purchases of fuel at fuel stations to determine fuel prices for the fuel stations, and to associating, in a fuel price data structure, fuel prices with information identifying the fuel stations. The description below with respect to FIGS. 1C and 1D relates to receiving a request for fuel prices and to providing, based on the request, fuel prices for particular fuel stations (e.g., in a geographic area). In some implementations, upon receiving the request, the fuel price determination system may access the fuel price data structure to identify fuel prices that were previously determined based on previously processing the data for the particular fuel stations, as described herein. Alternatively, upon receiving the request, the fuel price determination system may currently process the data to determine the fuel prices for the particular fuel stations.

As shown in FIG. 1A, and by reference number 105, the fuel price determination system may receive transaction data identifying purchases, associated with mobile transaction card applications of client devices and associated with transaction cards, of fuel at fuel stations. The transaction data may include, with respect to a purchase of fuel, information related to a transaction that includes the purchase of fuel, such as a transaction amount (e.g., a dollar amount) of the transaction, a time of the transaction (e.g., a date and time of one or more points of the transaction, such as preauthorization of the transaction, completion of the transaction, and/or the like), a transaction identifier, and/or the like. Additionally, in some implementations, the transaction data may include information related to the merchant associated with the purchase of fuel (e.g., a merchant identifier, name, address, telephone number, and/or the like). Additionally, or alternatively, the transaction data may include information related to the user making the purchase of fuel (e.g., a user identifier, account number, transaction card number, client device identifier, mobile telephone number, and/or the like). In some cases, the transaction data may include a fuel price of the fuel dispensed in association with the transaction, an amount of fuel dispensed, a grade of fuel dispensed (e.g., octane level), a type of fuel dispensed (e.g., unleaded, diesel, ethanol, and/or the like), and/or the like.

In some implementations, the fuel price determination system may receive the transaction data from the client device (e.g., from the mobile transaction card application). Additionally, or alternatively, the fuel price determination system may receive the transaction data from the transaction card (e.g., via the mobile transaction card application or other application or device that transmits the transaction data), from a fuel dispenser or point of sale (POS) device that reads the transaction card data from the transaction card or client device, and/or the like. Additionally, or alternatively, the fuel price determination system may receive the transaction data from a server (e.g., a transaction server) that receives transaction data and provides fuel-related transaction data to the fuel price determination system, and/or the like.

In some implementations, the fuel price determination system may receive the transaction data based on a purchase of fuel being made using the transaction card. For example, the mobile transaction card application may provide, to the fuel price determination system, transaction data for transactions in general, and the fuel price determination system may discard transaction data associated with transactions that do not include purchases of fuel. Additionally, or alternatively, the mobile transaction card application may only provide transaction data that includes merchant information associated with a fuel station, may only provide transaction data when global positioning system (GPS) coordinates of the client device correspond to a location of a fuel station, and/or the like.

In some implementations, the fuel price determination system may receive the transaction data based on providing a request for the transaction data to the client device, fuel dispenser, POS device, server, and/or the like that provides the transaction data, as described above. For example, the fuel price determination system may provide the request to a fuel station based on a fuel price of the fuel station not having been received and/or updated for a threshold period of time, based on receiving a request for a fuel price at a particular fuel station (e.g., in a geographical area, as will be explained with respect to FIGS. 1C and 1D), and/or the like. In this case, for a particular fuel station, a particular grade or type of fuel at a particular fuel station, and/or the like, the fuel price determination system may receive transaction data associated with a most recent transaction since the request was provided, may receive transaction data associated with multiple transactions (e.g., all transactions since a previous request from the fuel price determination system, a five most recent transactions, and/or the like), and/or the like. Alternatively, the fuel price determination system may receive the transaction data periodically (e.g., hourly, daily, at particular times of day, more frequently at certain times of day, and/or the like). In this case, for a particular fuel station, a particular grade or type of fuel at a particular fuel station, and/or the like, the fuel price determination system may receive transaction data associated with a most recent transaction of a time period, may receive multiple transactions (e.g., all transactions over the time period, a five most recent transactions from the time period, and/or the like), and/or the like.

As further shown in FIG. 1A, and as shown by reference number 110, the fuel price determination system may receive location data identifying locations associated with users of the client devices and the transaction cards, and vehicle data associated with vehicles of the users of the client devices. The location data may include, with respect to a purchase of fuel, merchant information (e.g., as described above) that identifies the location of the fuel station (e.g., a street address, a merchant identifier that can be associated with a street address, and/or the like). Additionally, or alternatively, the location data may include geographic location information identifying where the purchase of fuel is made. For example, the geographic location information may include geographic coordinates, such as GPS coordinates of the client device when the client device is at the fuel station. In this case, the geographic location information may identify more than one location at the fuel station (e.g., corresponding to more than one point in time during the transaction, as may be obtained from the transaction data).

The vehicle data may include, with respect to a purchase of fuel, information associated with the vehicle for which the purchase of fuel is made. For example, the vehicle data may include fuel information indicating a fuel level of the vehicle, odometer information indicating a mileage of the vehicle at the time of the purchase of fuel, navigation information or fleet tracking information associated with travel of the vehicle, and/or the like. Additionally, or alternatively, the vehicle data may include a vehicle identifier (e.g., a vehicle identification number), a vehicle type (e.g., a make, model, and/or version of the vehicle), a fuel tank size, a miles per gallon (MPG) rating of the vehicle, and/or the like.

In some implementations, the fuel price determination system may receive the location data from the mobile transaction card application, the transaction card, a fuel dispenser, a POS terminal, an in-vehicle device, a server (e.g., a transaction server), and/or the like, such as where the location data includes merchant information associated with the transaction. Additionally, or alternatively, the fuel price determination system may receive the location data from the client device (e.g., via the fuel price determination application installed on the client device) such as where the location data includes geographic coordinates such as GPS coordinates.

In some implementations, the fuel price determination system may receive the vehicle data from the vehicle, such as via the client device (e.g., from the fuel price determination application on the client device). In this case, the client device may receive the vehicle data from an engine control module, from one or more sensors on the vehicle (e.g., a fuel sensor), from an in-vehicle device, from a navigation application installed on the client device or the vehicle (or a navigation server that interacts with the client device or vehicle), from a fleet tracking application installed on the client device or the vehicle (or a fleet tracking server that interacts with the client device or vehicle), and/or the like. In some implementations, the client device may receive vehicle data via manual input by a user of the client device, such as via the fuel price determination application of the client device.

In some implementations, the fuel price determination system may receive the location data and/or the vehicle data based on providing a request for location data and/or vehicle data to the client device (e.g., to the fuel price determination application on the client device). For example, the fuel price determination system may provide the request based on receiving transaction data associated with a purchase of fuel, as described above. Additionally, or alternatively, the fuel price determination system may provide the request periodically (e.g., at same times the fuel price determination system provides requests for transaction data, as described above). In some implementations, such as where the location data includes merchant information that identifies the location of the fuel station, the fuel price determination system may receive the location data based on providing a request to the mobile transaction card application, as described above.

As further shown in FIG. 1A, and as shown by reference number 115, the fuel price determination system may receive user history data associated with prior purchases of fuel at fuel stations by the users. The user history data may include, with respect to a user associated with a purchase of fuel, a purchase history that includes information associated with prior purchases of fuel by the user. In some implementations, the purchase history may include, for a prior purchase of fuel, transaction data, location data, and/or vehicle data similar to that which is described above with respect to a current purchase of fuel. In some implementations, the user history data may additionally include data (e.g., a fuel price, a fuel amount, and/or the like) that was previously generated by a machine learning model (e.g., as will be described with respect to FIG. 1B), such as when processing transaction data, location data, and user history data that was associated with a prior purchase.

Additionally, or alternatively, the user history data may include, with respect to a user associated with a purchase of fuel, purchase habit information that identifies purchase habits of the user at fuel stations. For example, the purchase habit information may indicate one or more particular behaviors of a user, such as a typical fuel amount, grade of fuel, or type of fuel the user typically dispenses, whether the user typically fills the fuel tank, and/or the like. In some implementations, the purchase habit information may indicate frequency of a behavior, such as with a level (e.g., always, typically, often, sometimes, seldom, never), a percentage of occurrence, and/or the like. In some implementations, the purchase habit information may include information that was previously provided by the user. For example, the user may have used the fuel price determination application to enter an amount of fuel the user typically dispenses. Additionally, or alternatively, the fuel price determination system may have derived the purchase habit information based on the purchase history. For example, the fuel price determination system may have determined a typical amount of fuel the user dispenses based on previous amounts of fuel dispensed in previous purchases by the user.

In some implementations, the fuel price determination system may receive the user history data from a data structure (e.g., maintained by the fuel price determination system or a system or device external to the fuel price determination system) that includes user history data for a comprehensive set of users associated with the fuel price determination system. In this case, with respect to a purchase of fuel, the fuel price determination system may receive, from the data structure, user history data for the specific user associated with the purchase of fuel.

In some implementations, the fuel price determination system may receive the user history data based on retrieving the user history data from the data structure, providing a request to the external system or device to retrieve the user history data from the data structure, and/or the like. For example, the fuel price determination system may retrieve the user history data or provide the request based on receiving transaction data, location data, and/or vehicle data associated with a purchase of fuel, as described above. Additionally, or alternatively, the fuel price determination system may retrieve the user history data or provide the request periodically (e.g., at same times the fuel price determination system provides requests for transaction data, location data, and/or vehicle data, as described above).

The fuel price determination system may store the transaction data, the location data, the vehicle data, and the user history data in a data structure. For example, the fuel price determination system may associate the transaction data, the location data, the vehicle data, and the user history data for a same purchase of fuel with each other in the data structure.

Figure 1B:
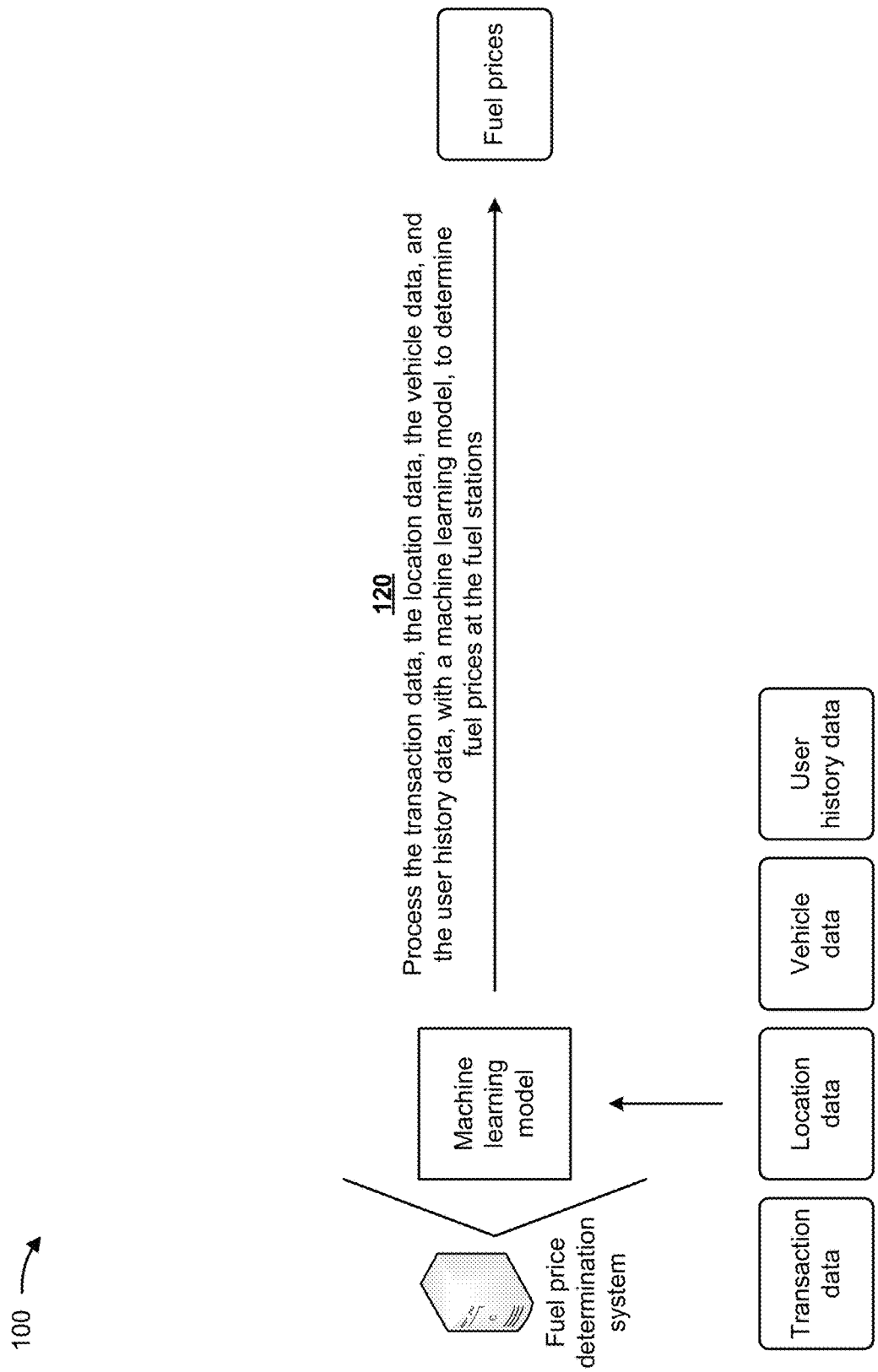

As shown in FIG. 1B, and by reference number 120, the fuel price determination system may process the transaction data, the location data, the vehicle data, and the user history data, with a machine learning model, to determine fuel prices at the fuel stations. For example, for a purchase of fuel, the fuel price determination system may process the transaction data, the location data, the vehicle data, and the user history data associated with the purchase of fuel to determine the fuel price at the fuel station associated with the purchase of fuel, and may store the fuel price in a fuel price data structure (e.g., a database, a table, a list, and/or the like) that contains designated fuel prices that represent the most recently determined fuel prices (e.g., for all fuel prices that have been determined by the fuel price determination system, for a comprehensive set of fuel stations, and/or the like). A designated fuel price for a fuel station may be stored in association with information identifying the fuel station, with additional information (e.g., identifying a date and time of a most recent update of the designated fuel price), and/or the like.

In some implementations, for a purchase of fuel, the machine learning model may determine a calculation to perform based on the transaction data, the location data, the vehicle data, and/or the user history data, may perform the calculation using the transaction data, the location data, the vehicle data, and/or the user history data, and may determine the fuel price based on performing the calculation. In some implementations, as described below, the machine learning model may determine the fuel price for a fuel station by predicting a fuel price for the fuel station and determining a confidence score for the prediction, and by replacing a designated fuel price (that has been previously determined for the fuel station) with the predicted fuel price if the confidence score satisfies a threshold. In some implementations, the machine learning model may determine the fuel price in other ways, such as be identifying patterns in and relationships among the transaction data, the location data, the vehicle data, and/or the user history data. For example, the machine learning model may include a clustering model that employs cluster analysis (also known as clustering) to identify similarities in objects and group the objects into clusters based on the similarities.

The fuel price determination system may train the machine learning model, with historical transaction data, historical location data, historical vehicle data, and/or historical user history data, to generate a trained machine learning model that determines fuel prices at fuel stations. For example, the fuel price determination system may train the machine learning model in a manner similar to the manner described below in connection with FIG. 2. In some implementations, rather than training the machine learning model, the fuel price determination system obtains the machine learning model from another system or device that trained the machine learning model. In this case, the fuel price determination system may provide the other system or device with historical data for use in training the machine learning model, and may provide the other system or device with updated historical data to retrain the machine learning model in order to update the machine learning model.

The fuel price determination system may process the transaction data, the location data, the vehicle data, and/or the user history data, with the trained machine learning model, to determine fuel prices at the fuel stations. In some implementations, the fuel price determination system may process the transaction data, the location data, the vehicle data, and/or the user history data with the trained machine learning model based on receiving information indicating the occurrence of a purchase at one of the fuel stations in the geographical area (e.g., from the client device and/or another system or device associated with the purchase). When processing the transaction data, the location data, the vehicle data, and/or the user history data, the fuel price determination system may apply the machine learning model to a new observation in a manner similar to the manner described below in connection with FIG. 2.

In some cases, the machine learning model may predict the fuel price based on existing information that does not have to be calculated or otherwise derived. For example, in some cases, the transaction data may include the fuel price, and the machine learning model may determine the fuel price to be the fuel price in the transaction data. As another example, in some cases, the transaction data may include the amount of fuel dispensed for the purchase of fuel, and the machine learning model may determine the amount of fuel to be the amount of fuel in the transaction data. In this case, the machine learning model may calculate the fuel price by dividing the transaction amount, associated with the purchase of fuel, by the amount of fuel dispensed. In some implementations, the fuel price determination system may access the fuel information in the vehicle data, the user history data, and/or the like to determine an amount of fuel in the fuel tank immediately before the fuel is dispensed (e.g., after arriving at the fuel station and before dispensing the fuel) and immediately after the fuel is dispensed (e.g., after dispensing the fuel and before leaving the fuel station), and may subtract the amount of fuel in the fuel tank before the fuel was dispensed from the amount of fuel in the fuel tank after the fuel was dispensed to determine the amount of fuel dispensed. The machine learning model may thereafter calculate the fuel price by dividing the transaction amount by the amount of fuel dispensed, as described above.

In some implementations, the machine learning model may predict a fuel price for the fuel station based on predicting the amount of fuel dispensed. For example, the machine learning model may predict the amount of fuel dispensed based on determining whether users are fixed fuel amount users who typically dispense a same amount of fuel (e.g., who always dispense a same amount of fuel, dispense a same amount of fuel at least a threshold percentage of the time, and/or the like) or variable fuel amount users (e.g., who do not always dispense a same amount of fuel or do not dispense a same amount of fuel at least a threshold percentage of the time). Additionally, or alternatively, the machine learning model may predict the amount of fuel dispensed based on determining whether users are fixed transaction amount users who typically purchase a same amount of fuel (e.g., who always purchase a same dollar amount of fuel, purchase a same dollar amount of fuel at least a threshold percentage of the time, and/or the like) or variable transaction amount users (e.g., who do not always purchase a same dollar amount of fuel or do not purchase a same dollar amount of fuel at least a threshold percentage of the time), and/or the like.

If a user is a fixed fuel amount user, the machine learning model may predict an amount of fuel dispensed to be the same as an amount of fuel that the user typically dispenses, as described below. For example, if the user history data indicates that the user typically dispenses 10 gallons of fuel, the machine learning model may predict the user will dispense 10 gallons of fuel in the current purchase, and may thereby predict the fuel price based on dividing the transaction amount by the predicted amount of fuel dispensed. In this case, if the transaction amount is $22.40, the machine learning model may predict that the fuel price is $2.24 per gallon based on predicting the user will dispense 10 gallons of fuel.

If the user is a variable fuel amount user, the machine learning model may determine whether the user typically fills the fuel tank (e.g., based on the user history data). If the user typically fills the fuel tank, the machine learning model may predict an amount of fuel dispensed based on a distance that the vehicle has travelled since the most recent previous purchase of fuel. For example, for a user that typically fills the tank when purchasing fuel, the machine learning model may predict that the user filled up the fuel tank both in the previous fuel purchase and the current fuel purchase. In this case, the machine learning model may access the vehicle data to determine a distance the vehicle has travelled since the most recent fuel purchase and an MPG rating of the vehicle (or a type of the vehicle, from which the fuel price determination system may determine the MPG rating). The machine learning model may predict the amount of fuel expended between the previous and current purchases based on dividing the distance travelled by the MPG rating of the vehicle. For example, if the vehicle has travelled 500 miles since the most recent fuel purchase and has an MPG rating of 25 miles per gallon, the machine learning model may determine that 20 gallons of fuel were expended since the previous fuel purchase. Because the user filled up the fuel tank on both the previous and current fuel purchases, the machine learning model can predict that the amount of fuel dispensed in the current purchase will be approximately equal to the amount of fuel expended between the previous and current purchases. Thus, the machine learning model can determine the fuel price by dividing the transaction amount by the amount of fuel expended between fuel purchases.

If the user is a variable amount user but does not typically fill up the tank (or it is not known to typically fill up the tank), then the machine learning model may determine whether the transaction amount is a round number (e.g., $25.00) or within a threshold tolerance (e.g., 0.1%) of a round number, and/or the like. If the transaction amount is not a round number or within the threshold tolerance, the machine learning model may determine that the tank was likely filled up, and may predict an amount of fuel dispensed based on the distance the vehicle has travelled, as described above.

In some implementations, when the machine learning model predicts a fuel price for a fuel station, the machine learning model may determine a confidence score representing a level of confidence in the accuracy of the predicted fuel price. For example, if the transaction data includes the fuel price, and the machine learning model obtains the fuel price from the transaction data, the machine learning model may determine the confidence score to be 100%. As another example, if the user history data indicates that a user dispensed 10 gallons of fuel in 70% of the purchases of fuel made by the user, the machine learning model may assign a confidence score (e.g., 70%) to a fuel price prediction that is based on predicting a fuel amount of 10 gallons. In this case, if the user history data indicates that the user dispensed 10 gallons of fuel in a higher percentage of the purchases when purchasing fuel at the same fuel station as the current purchase, the machine learning model may increase the confidence score. Similarly, the machine learning model may increase the confidence score if the user dispensed 10 gallons in a higher percentage of purchases when purchasing fuel on a same day of the week, a same time of day, and/or the like, as the current purchase.

In some implementations, the machine learning model may increase or decrease the confidence score based on whether the transaction amount is likely to include items other than fuel. For example, the machine learning model may increase the confidence score if the transaction is completed within a threshold amount of time after the transaction card is authorized, indicating the user is less likely to have had time purchase other items in addition to fuel as part of the same transaction. As another example, the machine learning model may increase the confidence score if the transaction amount is a round number. Similarly, the machine learning model may decrease the confidence score if the user typically buys an even (e.g., round number) dollar amount (e.g., $20.00) worth of fuel and the transaction amount is an uneven (e.g., non-round) dollar amount (e.g., $24.77).

In many cases, a fuel station may provide different grades (e.g., octane levels) of fuel, and each different grade of fuel may have a different fuel price. In such a case, the machine learning model may predict the fuel price specific to a particular grade of fuel at the fuel station. In some implementations, the machine learning model may utilize the user history data to predict the grade of fuel dispensed (e.g., based on a grade of fuel previously dispensed by the user), and may predict the fuel price for the predicted grade of fuel (e.g., in a similar fashion as described herein). If a confidence score is utilized for the predicted fuel price, the machine learning model may adjust the confidence score based on a confidence of the prediction of the grade of fuel (e.g., which may also take into account the fuel station, day of the week, time of day associated with previous purchases), and/or the like. In some cases, a fuel station may provide different types of fuel (e.g., unleaded, diesel, ethanol, and/or the like). In this case, the machine learning model may predict the fuel price of a specific type of fuel in a similar fashion. In this case, the machine learning model may predict the type of fuel based on the user history data, based on a type of vehicle, and/or the like.

In some implementations, the fuel price determination system may use the confidence score to determine the fuel price for a fuel station based on a predicted fuel price for the fuel station. In this case, the machine learning model may identify a designated fuel price that has been previously determined for the fuel station (e.g., and is currently provided to users as the designated fuel price for the fuel station, as will be described herein) and may determine whether to replace the designated fuel price with the predicted fuel price based on the confidence score. For example, if the confidence score satisfies a threshold for replacing the designated fuel price, the fuel price determination system may replace the designated fuel price with the predicted fuel price as a new designated fuel price in the fuel price data structure.

In implementations in which the machine learning model predicts a grade or type of fuel that is dispensed by the user and predicts a fuel price for the predicted grade or type of fuel, as described above, the machine learning model may maintain a different designated fuel price for each different grade or type of fuel. In this case, the machine learning model may identify a designated fuel price that has been previously determined for the grade or type of fuel at the fuel station, and may determine whether to replace the designated fuel price for the grade or type of fuel with the predicted fuel price based on the confidence score, in a manner similar to that described above. In some implementations, if insufficient fuel price information exists for a particular grade of fuel, the machine learning model may extrapolate a fuel price for the particular grade of fuel from other grades of fuel at the fuel station for which fuel prices are known (e.g., based on numerical relationships (e.g., a ratio, a difference, and/or the like) among different grades of fuel at other fuel stations or at the fuel station in prior purchases of fuel).

In some implementations, the machine learning model may eliminate a predicted fuel price from consideration as a designated fuel price (e.g., by assigning a confidence score of 0% to) based on a significant disparity between the predicted fuel price and other fuel prices. For example, the machine learning model may eliminate a predicted fuel price for a fuel station if the predicted fuel price satisfies a is at least a threshold difference (e.g., 20%) from a designated price for the fuel station. As another example, the machine learning model may eliminate a predicted fuel price for a particular grade of fuel if the predicted fuel price is higher than a designated fuel price of a higher grade of fuel. In some implementations, the machine learning model may eliminate a predicted fuel price based on insufficient data. Additionally, or alternatively, the machine learning model may eliminate a predicted fuel price based on determining that the transaction does not include a purchase of fuel (i.e., was for non-fuel items only). For example, the machine learning model may determine that the purchase does not include a purchase of fuel based on the location data indicating that the client device was not within a threshold distance of a fuel dispenser, transaction data indicating that no preauthorization was obtained for a transaction card, and/or the like.

Figure 1C:
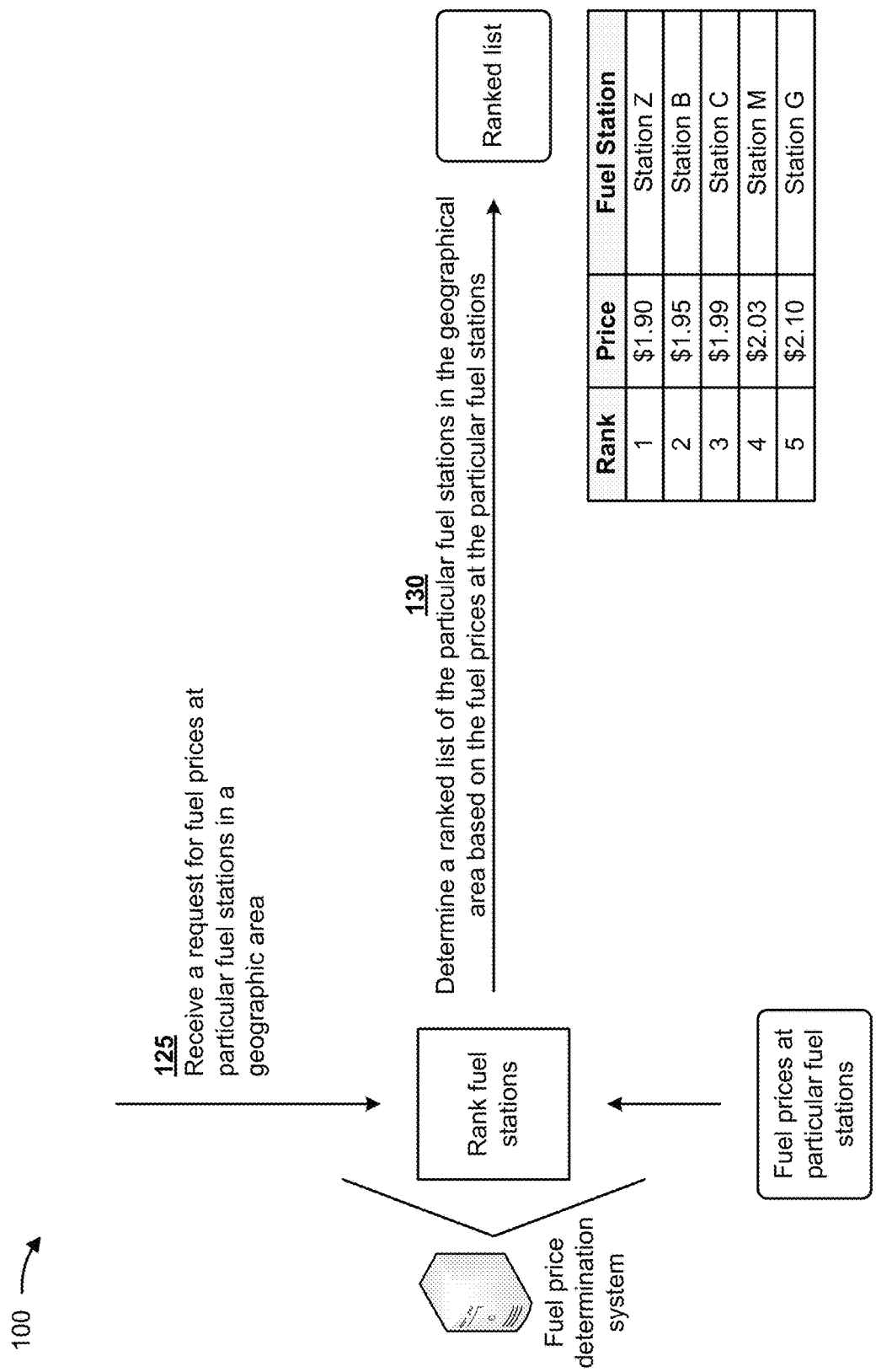

As shown in FIG. 1C, and by reference number 125, the fuel price determination system may receive a request for fuel prices at particular fuel stations in a geographical area. The request may be from a client device of a user (e.g., a driver currently operating a vehicle). For example, the user may initiate the request (e.g., via the fuel price determination application) based on a desire to purchase fuel, and the client device may provide the request to the fuel price determination system based on the user initiating the request. As another example, the client device may automatically provide the request, such as based on information received from the vehicle (e.g., indicating that the fuel tank is below a threshold amount), and/or the like. The geographic area may be an area that surrounds the user, such that the particular fuel stations in a vicinity of the user are within the geographical area. In some implementations, the geographical area may be based on a direction of travel of the user, a planned destination of the user, and/or the like.

As further shown in FIG. 1C, and by reference number 130, the fuel price determination system may determine a ranked list of the particular fuel stations in the geographical area based on the fuel prices (e.g., the designated fuel prices, as described above) at the particular fuel stations. In some implementations, the ranked list may rank the particular fuel stations (e.g., all of the particular fuel stations in the geographical area) in an order based on the fuel prices at the particular fuel stations. For example, where the particular fuel stations include a first fuel station with a less expensive fuel price and a second fuel station with a more expensive fuel price, the first fuel station may be ranked higher in the ranked list than the second fuel station.

In some implementations, the ranked list may rank the particular fuel stations in an order based on additional factors. For example, the fuel price determination system may determine geographical distances between locations of the particular fuel stations and a location of a client device of a user, and may associate data identifying the geographical distances with the ranked list of the particular fuel stations to generate a modified ranked list of the particular fuel stations. As a specific example, the fuel price determination system may score each particular fuel station based on a combination of inexpensiveness of the fuel price at the particular fuel station and shortness of driving distance to the particular fuel station from the location of the client device, and may rank the particular fuel stations based on the score.

In implementations where the machine learning model determines different fuel prices for different grades of fuel, the fuel price determination system may determine a different, grade-specific ranked list for each of the different grades of fuel. In this case, each grade-specific ranked list may rank the particular fuel stations in a manner similar to that described above. In some implementations, the fuel price determination system may select a grade-specific ranked list, when determining the ranked list for the particular fuel stations, based on a predicted grade of fuel that is predicted by the machine learning model, as described above. Similarly, where the machine learning model determines different fuel prices for different types of fuel (e.g., unleaded, diesel, ethanol, and/or the like) as described above, the fuel price determination system may determine a different, type-specific ranked list for each of the different types of fuel. In this case, each type-specific ranked list may rank the particular fuel stations in a manner similar to that described above. In some implementations, the fuel price determination system may select a type-specific ranked list, when determining the ranked list for the particular fuel stations, based on a predicted type of fuel that is predicted by the machine learning model, as described above.

Figure 1D:
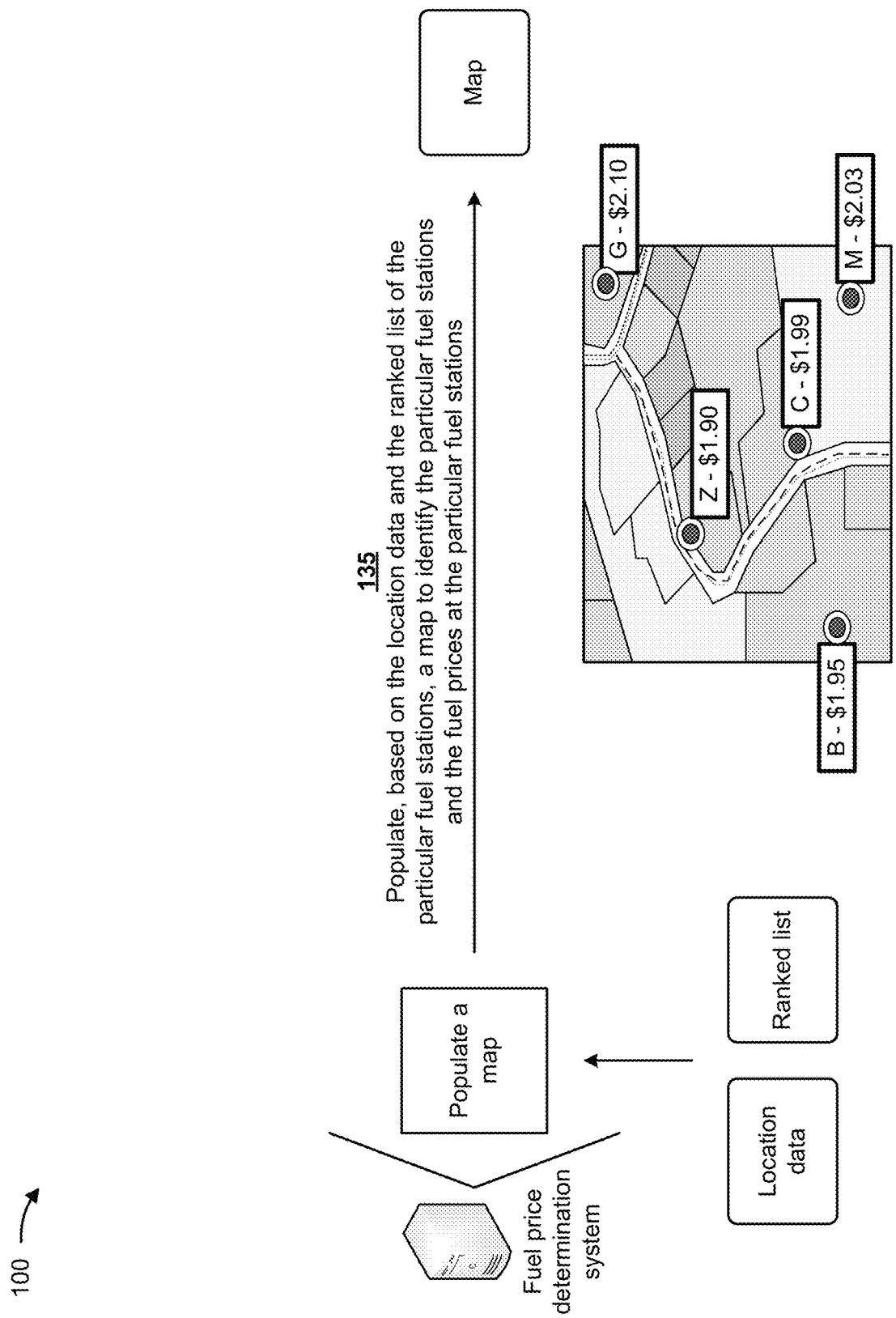

As shown in FIG. 1D, and by reference number 135, the fuel price determination system may populate, based on the location data and the ranked list of the particular fuel stations, a map to identify the particular fuel stations and the fuel prices at the particular fuel stations. For example, the fuel price determination system may determine a set of the particular fuel stations with the lowest fuel prices based on the ranked list, may provide indicators to highlight the set of particular fuel stations in the map, and may overlay the indicators on the map (e.g., at locations of the map that correspond to locations of the particular fuel stations as indicated by the location data). The fuel price determination system may provide the map to one or more client devices (e.g., of users of the fuel price determination application). For example, the fuel price determination system may provide the map to a client device upon receiving a request from a client device of a user who indicates (e.g., via the fuel price determination application) a desire to purchase fuel in a vicinity of the user's current location.

In some implementations, the fuel price determination system may determine geographical distances between locations of the particular fuel stations and a location of the client device (e.g., as described above), and may provide data identifying the geographical distances in the map with the fuel prices at the particular fuel stations. Additionally, or alternatively, the fuel price determination system may determine hours of operation for the particular fuel stations, and may provide data identifying the hours of operation in the map with the fuel prices at the particular fuel stations. In this case, in some implementations, the fuel price determination system may refrain from displaying particular fuel stations whose hours of operation indicate they are not currently open. Additionally, or alternatively, the fuel price determination system may identify confidence scores for the fuel stations, and may display fuel prices differently (e.g., preceded by "Estimated") for fuel stations having confidence scores that do not satisfy a threshold. Additionally, or alternatively, the fuel price determination system may display information indicating a grade or type of fuel the fuel prices apply to, may display the fuel prices for multiple grades or types of fuel, may display a menu from which the user can select a grade or type of fuel to display prices for, and/or the like.

In some implementations, the fuel price determination system may determine a set of the particular fuel stations that is geographically located within a threshold distance from the client device, and may identify, based on the ranked list, one fuel station from the set of the particular fuel stations with a lowest fuel price. In this case, the fuel price determination system may highlight the one fuel station in the map. In some implementations, the fuel price determination system may adjust the threshold distance based on a number of the particular fuel stations within the threshold distance, based on input from the user of the client device, and/or the like.

As shown in FIG. 1E, and by reference number 140, the fuel price determination system may perform one or more actions based on the map. In some implementations, the one or more actions may include the fuel price determination system providing an overlay identifying the particular fuel stations and the fuel prices to a client device via a navigation application. For example, the navigation application may be installed on the client device, and may display information associated with the particular fuel stations and the fuel prices on a map that displays a location of the client device within a surrounding area that includes locations of the particular fuel stations. In some implementations, the one or more actions may include the fuel price determination system generating directions to one of the particular fuel stations and providing the directions, via the map, to one of the client devices. For example, the fuel price determination system may generate the directions in a user interface of the fuel price determination application, via the navigation application, and/or the like. In this way, the fuel price determination system enables the user to efficiently identify and navigate to a particular fuel station without having to access and operate multiple systems, which may reduce driving hazards and conserve computing resources, networking resources, and/or the like that would otherwise be required to utilize multiple systems.

In some implementations, the one or more actions may include the fuel price determination system providing the map to one of the client devices via an email application. Additionally, or alternatively, the one or more actions may include the fuel price determination system providing the map to one of the client devices via an instant messaging application. In this way, the fuel price determination system may make the map available to the user without requiring applications (e.g., a mapping application, a navigation application, and/or the like) to be installed, invoked, and/or executed on a client device, which may conserve computing resources, networking resources, and/or the like that would otherwise be required to install, invoke, and/or execute applications, access websites, and/or the like.

In some implementations, the one or more actions may include the fuel price determination system providing the map and the ranked list to one of the client devices and receiving a selection of one of fuel stations in the ranked list. In this case, the fuel price determination system may determine, based on the selection, directions from a location of the client device to a location of the selected fuel station, and may provide the directions to the client device. In this way, the fuel price determination system enables the user to make an informed selection and efficiently navigate to the selected one of the particular fuel stations, and to eliminate driver distractions and conserve computing resources, networking resources, and/or the like that would otherwise be required, for example, to identify a fuel station and then enter information associated with the identified fuel station into a navigation system.

In some implementations, the one or more actions may include the fuel price determination system causing an autonomous vehicle to drive to one of the fuel stations based on the map. For example, the fuel price determination system may select one of the fuel stations having a least expensive fuel price and/or a shortest driving distance. In this way, the fuel price determination system enables the autonomous vehicle to automatically perform intelligent fueling decisions without requiring a human operator. In some implementations, the one or more actions may include the fuel price determination system causing an autonomous flying vehicle to fly to one of the fuel stations to capture images of the fuel prices for confirmation and feedback for retraining the machine learning model. In this way, the fuel price determination system may confirm the fuel prices without requiring input from users.

In some implementations, the one or more actions may include the fuel price determination system generating and/or providing a report of fuel prices over time in particular areas (e.g., a zip code, a county, a state, and/or the like). In this way, the fuel price determination system may enable a consumer of the report to utilize the fuel prices in the report to reduce fuel costs due to higher fuel prices, unnecessarily distant travel, and/or the like. This, in turn, may conserve computing resources, networking resources, and/or the like, that would otherwise be required to access, research, and/or compile fuel price information in order to reduce fuel costs.

In some implementations, upon receiving a request for fuel prices at particular fuel stations, the fuel price determination system may access the fuel price data structure to identify fuel prices that were previously determined based on previously processing data for the particular fuel stations, as described above. Alternatively, upon receiving the request, rather than accessing stored fuel prices that were previously determined based on previously processing data for the particular fuel stations, the fuel price determination system may currently process data to determine the fuel prices for the particular fuel stations. In some implementations, in addition to or instead of determining fuel prices at fuel stations, the fuel price determination system may determine prices of other energy sources related to powering a vehicle, such as electricity that may be provided to charge a battery of a vehicle.

In this way, the fuel price determination system enables a user to identify fuel stations with fuel prices that have a higher degree of accuracy than fuel prices that are based only on recent human input. This, in turn, conserves computing resources (e.g., processing resources, memory resources, communication resources, and/or the like), networking resources, and/or the like, such as resources of a client device that would otherwise be required for the user to perform research to identify a different fuel station, resources of the client device or a navigation system that would otherwise be required to compute a different route to a different fuel station, and/or the like. Furthermore, this saves time of the user and resources associated with the vehicle, such as fuel required to travel to the different fuel station.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
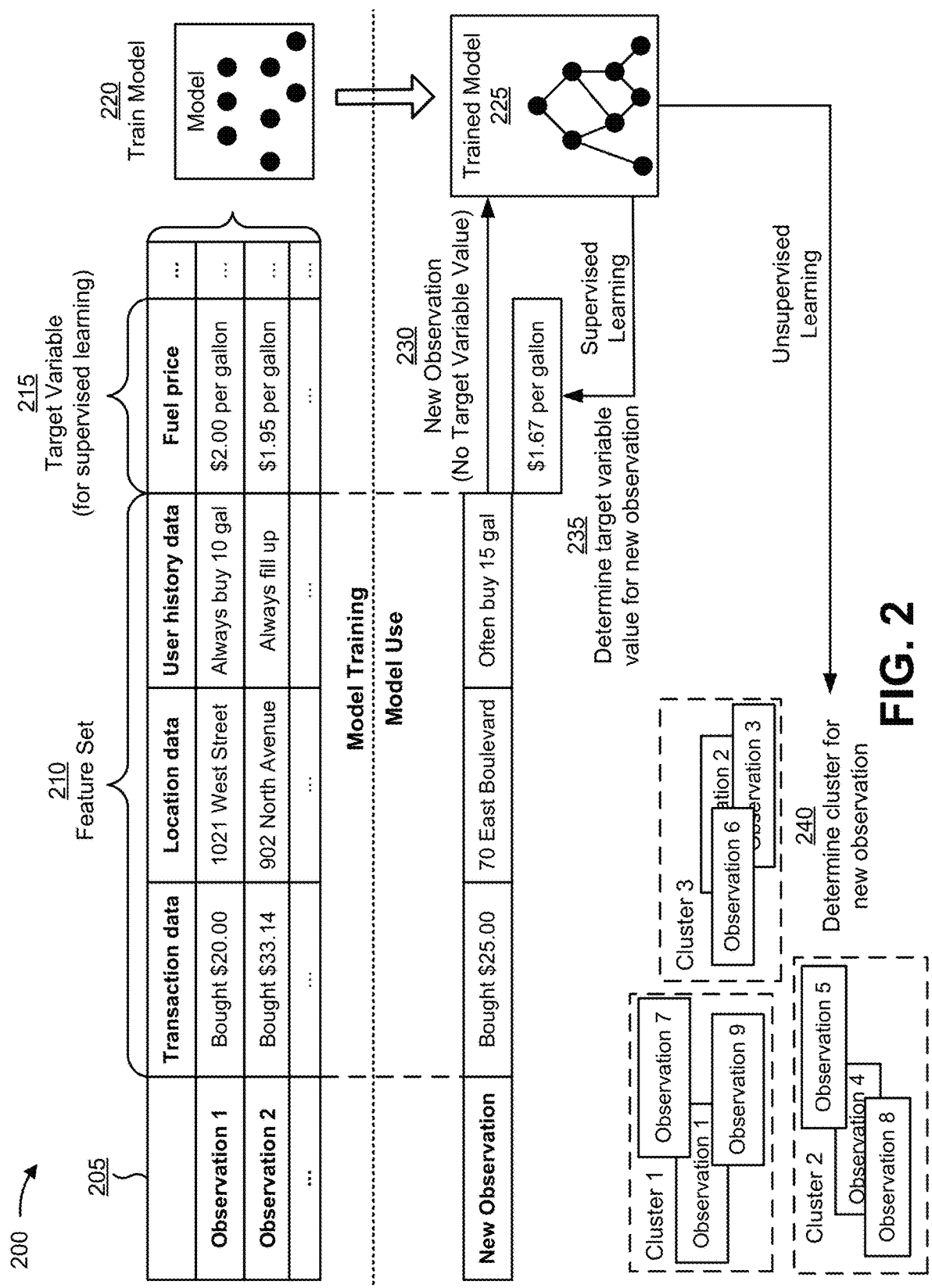
FIG. 2 is a diagram illustrating an example 200 of training and using a machine learning model in connection with utilizing machine learning and transaction data to determine fuel prices at fuel stations.

FIG. 2 is a diagram illustrating an example 200 of training and using a machine learning model in connection with determining fuel prices at fuel stations. The machine learning model training and usage described herein may be performed using a machine learning system. The machine learning system may include or may be included in a computing device, a server, a cloud computing environment, and/or the like, such as the fuel price determination system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the client device, maintained by the fuel price determination system, and/or the like, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the client device, maintained by the fuel price determination system, and/or the like. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of transaction data, a second feature of location data, a third feature of user history data, and so on. As shown, for a first observation, the first feature may have a value of "Bought $20.00", the second feature may have a value of "1021 West Street", the third feature may have a value of "Always buy 10 gal", and so on. In the example shown, for the third feature, the word "Always" may be used to indicate the user has bought 10 gallons in each of all previous purchases (or all previous purchases within a designated time period, all of a designated number of most recent purchases, and/or the like) whereas, for example, the word "Often" might be used to indicate the user has bought a certain amount in most (e.g., greater than 75%) of the previous purchases. These features and feature values are provided as examples, and may differ in other examples. For example, the feature set may include one or more of the following features: fuel grade purchased, date of purchase, time of purchase, day of the week of purchase, precise location of a client device during a purchase (e.g., GPS coordinates corresponding to a fuel dispenser area or a specific fuel dispenser), and/or the like. Specifically, the user history data may include purchase history and/or purchase habit information associated with fuel grade purchased, precise location of the client device during the purchase, date of purchase, time of purchase, day of the week of purchase, whether items other than fuel were purchased, portions of transaction amounts specifically for fuel, and/or the like. In some implementations, the feature set may include a confidence score indicating a confidence level of a determination (e.g., a fuel price determination, a fuel amount determination, and/or the like) that may be made based on other feature variables.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, labels, and/or the like), may represent a variable having a Boolean value, and/or the like. A target variable may be associated with a target variable value, and a target variable value may be specific to an observation. In example 200, the target variable is fuel price, which has a value of $2.00 per gallon for the first observation.

The feature set and target variable described above are provided as examples, and other examples may differ from what is described above. For example, for a target variable that indicates whether the fuel price determined for an new observation should be included and/or factored into a list of current fuel prices for different locations, as described above, the feature set or target variable may include a confidence score indicating a degree of confidence in the fuel price determined based on the new observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model. In some cases, the user may input the fuel price target variable for an observation during a fuel purchase transaction that is used for the observation for training the machine learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of "Bought $25.00", a second feature of "70 East Boulevard", a third feature of "Often buy 15 gal", and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a fuel price value based on dividing a transaction amount by an expected fuel amount (e.g., a value of $1.67 per gal for the new observation shown) for a specific user, location, and/or the like associated with the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like. The first recommendation may include, for example, a recommendation to update the fuel price for a particular fuel station (e.g., in a list of fuel prices for particular fuel stations in a geographical area) to $1.67 per gal if the trained machine learning model 225 determines a confidence score (e.g., indicating a level of confidence in the predicted fuel price) that satisfies a threshold for replacing the designated value with the predicted value. The first automated action may include, for example, an action to automatically include the updated fuel price on a map of the particular fuel stations in the geographical area.

As another example, if the machine learning system predicts a value of $1.67 per gallon for the fuel price target variable, determines that the confidence score does not satisfy the threshold for replacing the designated value with the predicted value but does satisfy a threshold for factoring in the predicted value (e.g., that is lower than the threshold for replacing the predicted value), then the machine learning system may provide a second (e.g., different) recommendation (e.g., to update the fuel price for the particular fuel station on the list of fuel prices to a fuel price that is determined as a function of the predicted fuel price in combination with other factors (e.g., an average of the predicted fuel price and the designated fuel price for the particular fuel station). In this case, the machine learning system may also perform the first automated action of including the updated fuel price on the map, as described above.

As still another example, if the machine learning system predicts a value of $1.67 per gallon for the fuel price target variable, and also determines a confidence score that does not satisfy the threshold for factoring in the predicted value, then the machine learning system may provide a third (e.g., different) recommendation (e.g., not to update the fuel price in the list of fuel prices). In this case, the machine learning system may not perform an automated action to update the map.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., confidence score satisfies threshold for replacing the designated value with the predicted value), then the machine learning system may provide a first recommendation, such as the first recommendation described above to replace the designated fuel price in the list with the predicted fuel price, as described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system classifies the new observation in a second cluster (e.g., confidence score does not exceed the threshold for replacing a designated value with the predicted value but exceeds threshold for factoring in the predicted value), then the machine learning system may provide a second recommendation such as the second recommendation to factor the predicted fuel price into updating the fuel price in the list, as described above, and may perform the first automated function, as described above, with respect to the updated fuel price. As still another example, if the machine learning system classifies the new observation in a third cluster (e.g., confidence score does not satisfy threshold for factoring in the predicted value), then the machine learning system may provide a third recommendation such as the third recommendation not to update the fuel price in the list, as described above, as described above, and may not perform or cause performance of an automated action.

In some implementations, the recommendation and/or the automated action associated with the new observation may be based on a target variable value having a particular label (e.g., classification, categorization, and/or the like), may be based on whether a target variable value satisfies one or more threshold (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine fuel prices at fuel stations. The machine learning system enables recognition and/or identification of tens, hundreds, thousands, or millions of features and/or feature values for tens, hundreds, thousands, or millions of observations, thereby increasing accuracy and consistency and reducing delay associated with determining fuel prices at fuel stations relative to requiring computing resources to be allocated for tens, hundreds, or thousands of operators to manually determine fuel prices at fuel stations using the features or feature values.

As indicated above, FIG. 2 is provided as an example. Other examples may differ from what is described in connection with FIG. 2.

Figure 3:
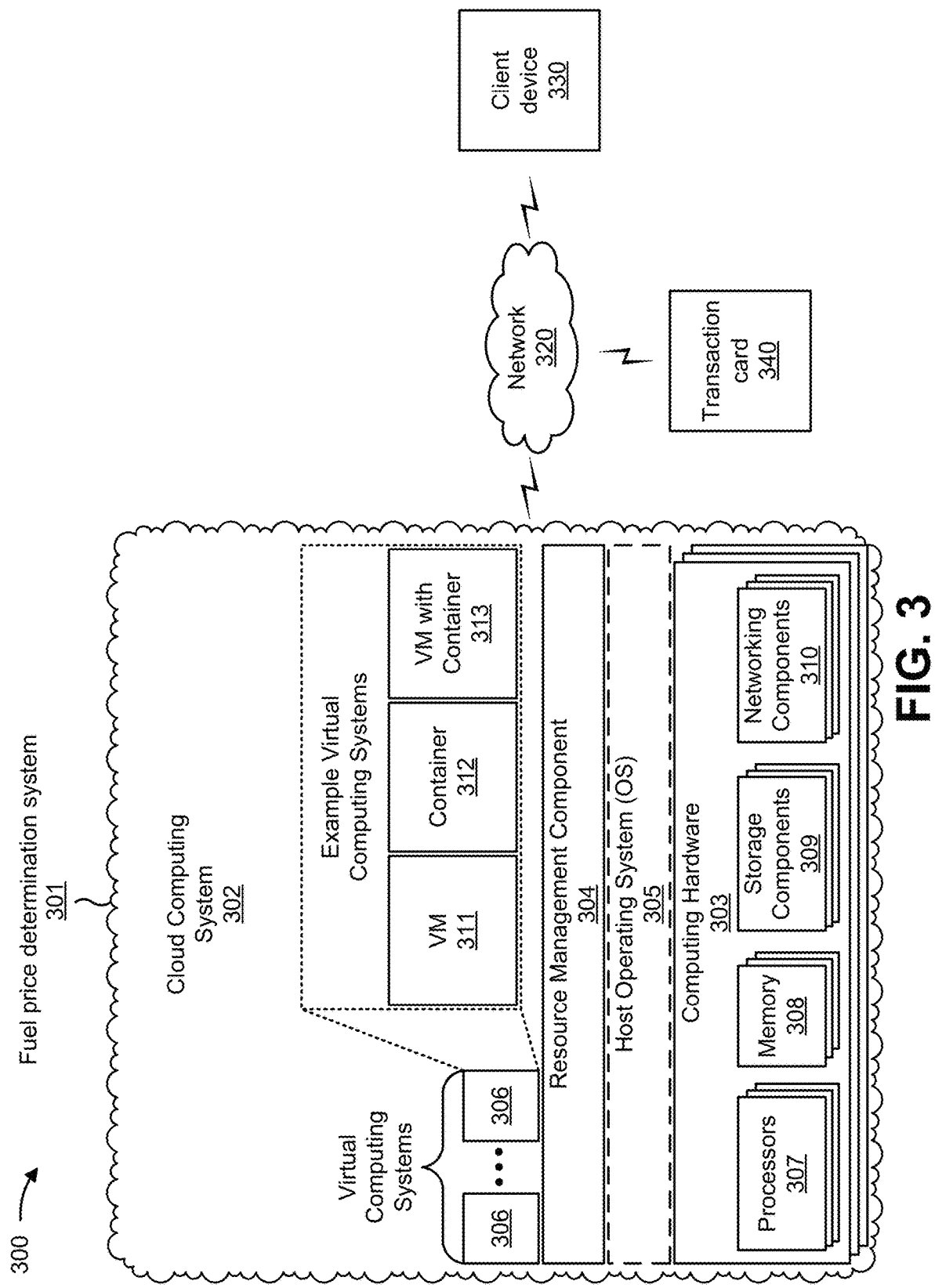
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a fuel price determination system 301, which may include one or more elements of and/or may execute within a cloud computing system 302. The cloud computing system 302 may include one or more elements 303-313, as described in more detail below. As further shown in FIG. 3, environment 300 may include a network 320, a client device 330, and/or a transaction card 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the fuel price determination system 301 may include one or more elements 303-313 of the cloud computing system 302, may execute within the cloud computing system 302, and/or may be hosted within the cloud computing system 302, in some implementations, the fuel price determination system 301 may not be cloud-based (e.g., may be implemented outside of a cloud computing system) or may be partially cloud-based. For example, the fuel price determination system 301 may include one or more devices that are not part of the cloud computing system 302, such as device 400 of FIG. 4, which may include a standalone server or another type of computing device. The fuel price determination system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

Client device 330 includes one or more devices capable of receiving, generating, storing, processing, and/or providing information associated with facilitating transactions associated with transaction card 340 and/or associated with interacting with fuel price determination system 301 to utilize machine learning and transaction data to determine fuel prices at fuel stations, as described elsewhere herein. The client device 330 may include a communication device and/or a computing device. For example, the client device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, a communication device attached to or otherwise associated with a vehicle, or a similar type of device. The client device 330 may communicate with one or more other devices of environment 300, as described elsewhere herein.

Transaction card 340 includes a transaction card capable of facilitating a transaction such as a payment transaction. For example, transaction card 340 may include a credit card, a debit card, a gift card, a payment card, an automated teller machine (ATM) card, a stored-value card, a fleet card, a driver's license card, and/or the like. In some implementations, transaction card 340 may be a transaction card that is capable of communicating via Bluetooth communication, BLE communication, Wi-Fi communication, a NFC session, and/or the like. Transaction card 340 may be capable of storing and/or communicating data for a payment transaction. For example, transaction card 340 may store and/or communicate data, including account information (e.g., an account identifier, a cardholder identifier, etc.), expiration information of transaction card 340 (e.g., information identifying an expiration month and/or year of transaction card 340), banking information (e.g., a routing number of a bank, a bank identifier, etc.), transaction information (e.g., a payment amount), and/or the like. Transaction card 340 may include a magnetic strip and/or an integrated circuit (IC) chip (e.g., a EUROPAY®, MASTERCARD®, VISA® (EMV) chip) to store and/or communicate the data.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
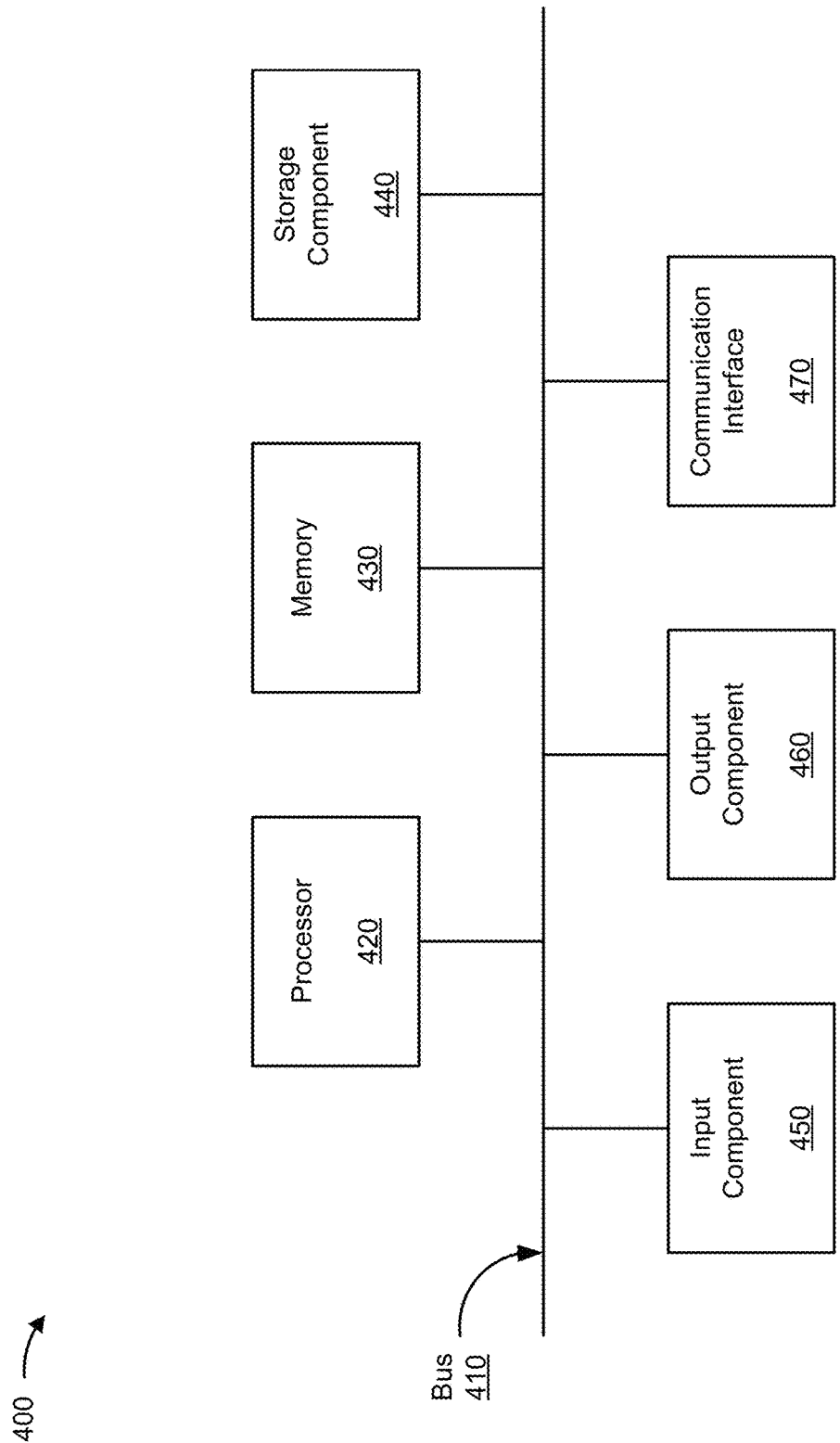
FIG. 4 is a diagram of example components of one or more devices of FIG. 3.

FIG. 4 is a diagram of example components of a device 400, which may correspond to fuel price determination system 301, client device 330, and/or transaction card 340. In some implementations, fuel price determination system 301, client device 330, and/or transaction card 340 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory), a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication interface 470 enables device 400 to communicate with other devices, such as via a wired connection and/or a wireless connection. For example, communication interface 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with utilizing machine learning and transaction data to determine fuel prices at fuel stations. In some implementations, one or more process blocks of FIG. 5 may be performed by a fuel price determination system (e.g., fuel price determination system 301). In some implementations, one or more process blocks of FIG. 5 may be performed by another device or a group of devices separate from or including the device, such as fuel price determination system 301, client device 330, transaction card 340, and/or the like. Additionally, or alternatively, one or more process blocks of FIG. 5 may be performed by one or more components of a device 400, such as processor 420, memory 430, storage component 440, input component 450, output component 460, communication interface 470, and/or the like.

As shown in FIG. 5, process 500 may include receiving transaction data identifying purchases of fuel at fuel stations, wherein the purchases of fuel are made with: mobile transaction card applications of client devices, and transaction cards (block 510). As further shown in FIG. 5, process 500 may include receiving location data identifying locations associated with users of the client devices and the transaction cards (block 520). As further shown in FIG. 5, process 500 may include receiving user history data associated with prior purchases of fuel at fuel stations by the users (block 530). As further shown in FIG. 5, process 500 may include processing the transaction data, the location data, and the user history data, with a machine learning model, to determine fuel prices at the fuel stations (block 540). As further shown in FIG. 5, process 500 may include determining a ranked list of particular fuel stations in a geographical area based on the fuel prices at the particular fuel stations (block 550). As further shown in FIG. 5, process 500 may include populating, based on the location data and the ranked list of the particular fuel stations, a map to identify the particular fuel stations and the fuel prices at the particular fuel stations (block 560). As further shown in FIG. 5, process 500 may include performing one or more actions based on the map (block 570).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, transaction data identifying purchases of fuel at fuel stations,
wherein the purchases of fuel are made with:
mobile transaction card applications of client devices, and
transaction cards;
receiving, by the device, location data identifying locations associated with users of the client devices and the transaction cards;
receiving, by the device, user history data associated with prior purchases of fuel at fuel stations by the users;
processing, by the device, the transaction data, the location data, and the user history data, with a machine learning model, to determine fuel prices at the fuel stations,
wherein processing the transaction data, the location data, and the user history data, with the machine learning model comprises:
determining a confidence score associated with a transaction amount, associated with the transaction data, that is associated with purchasing items other than fuel at a fuel station, of the fuel stations, based on determining whether a first transaction amount, of a single transaction, is associated with purchasing the items other than the fuel and determining whether a second transaction amount, of the single transaction, is associated with purchasing the fuel,
extrapolating a first fuel price, of the fuel prices, associated with a first grade of fuel, from a second fuel price, of the fuel prices, associated with a second grade of fuel,
wherein the first grade of fuel differs from the second type of grade,
classifying, using a clustering technique and based on the confidence score, the first transaction amount or the second transaction amount into a cluster, and
determining the fuel prices at the fuel stations based on classifying the first transaction amount or the second transaction amount into the cluster,
wherein the machine learning model is trained based on historical transaction data, historical location data, historical confidence scores, and historical vehicle data to determine particular fuel prices, and
wherein the machine learning model includes a clustering model that employs cluster analysis to identify similarities between any two of the following types of data or within any of the following types of data: the historical transaction data, the historical location data, the historical confidence scores, the historical vehicle data, and the particular fuel prices;
determining, by the device, a ranked list of particular fuel stations, of the fuel stations, in a geographical area based on determining the fuel prices at the fuel stations;
populating, by the device and based on the location data and the ranked list of the particular fuel stations, a map to identify the particular fuel stations and the fuel prices at the particular fuel stations,
wherein the map is configured to selectively display determined fuel prices in a first category based on the confidence score failing to satisfy a threshold or a second category based on the confidence score satisfying the threshold,
wherein the first category includes an indication that a particular fuel price is estimated, and
wherein the second category does not include the indication that the particular fuel price is estimated; and
performing, by the device, one or more actions based on the map.

2. The method of claim 1, wherein performing the one or more actions comprises one or more of:
providing an overlay identifying the particular fuel stations and the fuel prices to one of the client devices via a navigation application;
generating directions to one of the particular fuel stations and providing the directions, via the map, to one of the client devices;
providing the map to one of the client devices via an email application; or
causing an autonomous vehicle to drive to one of the fuel stations based on the map.

3. The method of claim 1, wherein performing the one or more actions comprises one or more of:
providing the map to one of the client devices via an instant messaging application;
providing the map and the ranked list to one of the client devices;
causing an autonomous flying vehicle to fly to one of the fuel stations to capture images of the fuel prices for confirmation and feedback for retraining the machine learning model; or
generating and providing a report of fuel prices over time in the geographical area.

4. The method of claim 1, wherein performing the one or more actions comprises:
providing the map and the ranked list to a particular client device of the client devices;
receiving, from the particular client device, data indicating a selection of one of the particular fuel stations from the ranked list;
determining, based on the selection, directions from a location of the particular client device to a location of the one of the particular fuel stations; and
providing the directions to the particular client device.

5. The method of claim 1, wherein populating the map to identify the particular fuel stations and the fuel prices at the particular fuel stations comprises:
determining a set of the particular fuel stations with lowest fuel prices based on the ranked list;
providing indicators to highlight the set of the particular fuel stations in the map; and
overlaying the indicators on the map.

6. The method of claim 1, wherein performing the one or more actions comprises:
determining a set of the particular fuel stations geographically located a threshold distance from a particular client device of the client devices;
identifying, based on the ranked list, one fuel station from the set of the particular fuel stations with a lowest fuel price;
determining directions from a location of the particular client device to a location of the one fuel station; and
providing the directions to the particular client device.

7. The method of claim 1, further comprising:

determining geographical distances between locations of the particular fuel stations and a location of a particular client device of the client devices;

associating data identifying the geographical distances with the ranked list of the particular fuel stations to generate a modified ranked list of the particular fuel stations; and providing the modified ranked list of the particular fuel stations to the particular client device.

8. A device, comprising:

one or more memories; and one or more processors, communicatively coupled to the one or more memories, configured to:

receive transaction data identifying purchases of fuel at fuel stations,
wherein the purchases of fuel are made with:
mobile transaction card applications of client devices, and
transaction cards;

receive location data identifying locations associated with users of the client devices and the transaction cards;

receive user history data associated with prior purchases of fuel at fuel stations by the users;

process the transaction data, the location data, and the user history data, with a machine learning model, to determine fuel amounts associated with the purchases of fuel, and to determine fuel prices at the fuel stations based on the fuel amounts,
wherein the one or more processors, to process the transaction data, the location data, and the user history data, with the machine learning model, are configured to:
determine a confidence score associated with a transaction amount, associated with the transaction data, that is associated with purchasing items other than fuel at a fuel station, of the fuel stations, of the fuel stations, based on determining whether a first transaction amount, of a single transaction, is associated with purchasing the items other than the fuel and determining whether a second transaction amount, of the single transaction, is associated with purchasing the fuel,
extrapolate a first fuel price, of the fuel prices, associated with a first grade of fuel, from a second fuel price, of the fuel prices, associated with a second grade of fuel,
wherein the first grade of fuel differ from the second grade of fuel,
classify, using a clustering technique and based on the confidence score, the first transaction amount or the second transaction amount into a cluster, and
determine the fuel prices at the fuel stations based on classifying the first transaction amount or the second transaction amount into the cluster,
wherein the machine learning model is trained based on any two of the following types of data or within any of the following types of data: historical transaction data, historical location data, historical confidence scores, and historical vehicle data to determine particular fuel prices, and
wherein the machine learning model employs cluster analysis to identify similarities between the historical transaction data, the historical location data, the historical confidence scores, the historical vehicle data and the particular fuel prices;

determine a ranked list of particular fuel stations, of the fuel stations, in a geographical area based on determining the fuel prices at the fuel stations;

populate, based on the location data and the ranked list of the particular fuel stations, a map to identify the particular fuel stations and the fuel prices at the particular fuel stations,
wherein the map is configured to selectively display determined fuel prices in a first category based on the confidence score failing to satisfy a threshold or a second category based on the confidence score satisfying the threshold,
wherein the first category includes an indication that a particular fuel price is estimated, and
wherein the second category does not include the indication that the particular fuel price is estimated; and perform one or more actions based on the map.

9. The device of claim 8, wherein the ranked list ranks the particular fuel stations in an order based on the fuel prices at the particular fuel stations,
wherein a first fuel station, of the particular fuel stations, with a less expensive fuel price is ranked higher in the ranked list than a second fuel station, of the particular fuel stations, with a more expensive fuel price.

10. The device of claim 8, wherein the one or more processors, when processing the transaction data, the location data, and the user history data, with the machine learning model, determine the fuel amounts based on determining whether the users are fixed fuel amount users or variable fuel amount users, or determining whether the users are fixed transaction amount users or variable transaction amount users.

11. The device of claim 8, wherein the one or more processors, when performing the one or more actions, are configured to:

determine geographical distances between locations of the particular fuel stations and a location of a particular client device of the client devices;

provide data identifying the geographical distances in the map with the fuel prices at the particular fuel stations; and provide the map to the particular client device.

12. The device of claim 8, wherein the one or more processors, when performing the one or more actions, are configured to:

determine hours of operation for the particular fuel stations;

provide data identifying the hours of operation in the map with the fuel prices at the particular fuel stations; and provide the map to one of the client devices.

13. The device of claim 8, wherein the one or more processors, when performing the one or more actions, are configured to:

determine geographical distances between locations of the particular fuel stations and a location of a particular client device of the client devices;

determine hours of operation for the particular fuel stations;

provide data identifying the geographical distances and the hours of operation in the map with the fuel prices at the particular fuel stations; and provide the map to the particular client device.

14. A non-transitory computer-readable medium storing instructions, the instructions comprising:

one or more instructions that, when executed by one or more processors, cause the one or more processors to:
receive transaction data identifying purchases of fuel at fuel stations,
  wherein the purchases of fuel are made with:
    mobile transaction card applications of client devices, and
    transaction cards;
receive location data identifying locations associated with users of the client devices and the transaction cards;
receive user history data associated with prior purchases of fuel at fuel stations by the users;
process the transaction data, the location data, and the user history data, with a machine learning model, to determine fuel prices at the fuel stations,
  wherein the one or more processors, to process the transaction data, the location data, and the user history data, with the machine learning model, are configured to:
    determine a confidence score associated with a transaction amount, associated with the transaction data, that is associated with purchasing items other than fuel at a fuel station, of the fuel stations, based on determining whether a first transaction amount, of a single transaction, is associated with purchasing the items other than the fuel and determining whether a second transaction amount, of the single transaction, is associated with purchasing the fuel,
    extrapolate a first fuel price, of the fuel prices, associated with a first grade of fuel, from a second fuel price, of the fuel prices, associated with a second grade of fuel,
      wherein the first grade of fuel differ from the second grade of fuel,
    classify, using a clustering technique and based on the confidence score, the first transaction amount or the second transaction amount into a cluster, and
    determine the fuel prices at the fuel stations based on classifying the first transaction amount or the second transaction amount into the cluster,
    wherein the machine learning model is trained based on historical transaction data, historical location data, historical confidence scores, and historical vehicle data to determine particular fuel prices, and
    wherein the machine learning model employs cluster analysis to identify similarities between any two of the following types of data or within any of the following types of data: the historical transaction data, the historical location data, the historical confidence scores, the historical vehicle data and the particular fuel prices;
determine a ranked list of particular fuel stations, of the fuel stations, in a geographical area based on determining the fuel prices at the fuel stations;
populate, based on the location data and the ranked list of the particular fuel stations, a map to identify the particular fuel stations and the fuel prices at the particular fuel stations,
  wherein the map is configured to selectively display determined fuel prices in a first category based on the confidence score failing to satisfy a threshold or a second category based on the confidence score satisfying the threshold,
  wherein the first category includes an indication that a particular fuel price is estimated, and
  wherein the second category does not include the indication that the particular fuel price is estimated;
determine, based on the location data and the ranked list of the particular fuel stations, information identifying the particular fuel stations and the fuel prices at the particular fuel stations; and
provide the information to one of the client devices.

15. The device of claim 8, wherein the one or more processors are further configured to:
replace a previously designated fuel price with a determined fuel price, of the fuel prices, based on determining the fuel prices.

16. The non-transitory computer-readable medium of claim 14, wherein the one or more instructions, when executed by the one or more processors, further cause the one or more processors to one or more of:
provide the information to the one of the client devices via a navigation application;
generate directions to one of the particular fuel stations and provide the directions to the one of the client devices;
provide the information to the one of the client devices via an email application;
provide the information to the one of the client devices via an instant messaging application;
provide the information and the ranked list to the one of the client devices; or
retrain the machine learning model based on the information.

17. The non-transitory computer-readable medium of claim 14, wherein the one or more instructions, when executed by the one or more processors, further cause the one or more processors to:
provide the information and the ranked list to the one of the client devices;
receive, from the one of the client devices, data indicating a selection of one of the particular fuel stations from the ranked list;
determine, based on the selection, directions from a location of the one of the client devices to a location of the one of the particular fuel stations; and
provide the directions to the one of the client devices.

18. The non-transitory computer-readable medium of claim 14, wherein the one or more instructions, when executed by the one or more processors, further cause the one or more processors to:
determine a set of the particular fuel stations geographically located a threshold distance from the one of the client devices;
identify, based on the ranked list, one fuel station from the set of the particular fuel stations with a lowest fuel price;
determine directions from a location of the one of the client devices to a location of the one fuel station; and
provide the directions to the one of the client devices.

19. The non-transitory computer-readable medium of claim 14, wherein the one or more instructions, when executed by the one or more processors, further cause the one or more processors to:
determine geographical distances between locations of the particular fuel stations and a location of the one of the client devices;

associate data identifying the geographical distances with the ranked list of the particular fuel stations to generate a modified ranked list of the particular fuel stations; and provide the modified ranked list of the particular fuel stations to the one of the client devices.

20. The non-transitory computer-readable medium of claim 14, wherein the one or more instructions, that cause the one or more processors to process the transaction data, the location data, and the user history data with the machine learning model, cause the one or more processors to process the transaction data, the location data, the user history data, and historical vehicle data associated with the users to determine the fuel prices at the fuel stations.

\* \* \* \* \*